US006304829B1

(12) United States Patent
Whittle et al.

(10) Patent No.: US 6,304,829 B1
(45) Date of Patent: Oct. 16, 2001

(54) METHOD AND SYSTEM FOR DYNAMIC TESTING OF A VEHICLE EXHAUST SYSTEM IN A RIGID FRAME TEST FIXTURE

(75) Inventors: Bruce Howard Whittle, Livonia; Arthur J. Page, Canton, both of MI (US); David M. Fricke, Prior Lake, MN (US); David W. Olson, Belleville, MI (US); James Alanoly, Farmington Hills, MI (US); Nabih Wassef Elsenety, Bloomfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/253,707

(22) Filed: Feb. 22, 1999

(51) Int. Cl.$^7$ ............................ G01M 10/00; G01L 25/00
(52) U.S. Cl. ........................................... 702/113; 73/23.31
(58) Field of Search ................................. 702/23, 24, 115, 702/121, 32, 73, 113, 170, 183, 145, 108, 33, 130, 196; 73/23.31; 701/29; 60/274

(56) References Cited

U.S. PATENT DOCUMENTS

| 3,718,033 | 2/1973 | Petersen . |
| 3,827,289 | 8/1974 | Borg . |
| 4,011,749 | 3/1977 | Cappel . |
| 4,164,152 | 8/1979 | Lemonde et al. . |
| 4,181,028 | 1/1980 | Talbott, Jr. . |
| 4,181,029 | 1/1980 | Talbott, Jr. . |
| 4,498,343 | 2/1985 | Kimball . |

(List continued on next page.)

FOREIGN PATENT DOCUMENTS

| 3515010 C2 | 2/1987 | (DE) . |
| 0 199 317 B1 | 4/1986 | (EP) . |
| 0 199 317 B1 | 5/1990 | (EP) . |

OTHER PUBLICATIONS

Team Corporation Web page published Bulletins, "Automotive Vibration Test System"; Engine Simulation Systems; "Four Poster Test Systems"; "The CUBE 6 Degrees of Control"; "Team Corporation Introduces the CUBE™ Six Degree of Control™ Vibration Test System"; and "Team Delivers Flexible 'Four Post' Test System"; May 20, 1998, 9 pp.

IATO Paper Techniques for Laboratory Durability Testing of Exhaust Systems (Steven R. Haeg, P.E.) Published 11/97 (SAE Indonesia).

*Primary Examiner*—Marc S. Hoff
*Assistant Examiner*—Dinh Hang
(74) *Attorney, Agent, or Firm*—Jerome R. Drouillard

(57) ABSTRACT

A method and system are provided for generating engine attachment control boundary conditions and corresponding control signals for an exhaust system laboratory test fixture which accurately reproduce both the dynamic behavior of a vehicle powertrain during operation, and the dynamic behavior of the vehicle frame during operation in the area where the exhaust system is attached to the vehicle frame. Road load data is collected in vertical, lateral, and longitudinal directions on the vehicle frame during vehicle operation at each of the locations where the exhaust system attaches. In addition, temperature and thermal cycling data are also collected during operation of the vehicle. The road load data is used to determine a best fit rigid body model. Accelerometer locations and directions are determined from statistical analysis and ranking to find the measures best fitting the determined rigid body. This information is then used to generate the test boundary conditions and control signals to be input to the test fixture. Thermal profiles are generated based on the collected temperature data to form input control signals to control heating of the exhaust system during testing. The generated thermal profiles allow simulation of real-world thermal stresses caused by hot exhaust gases.

23 Claims, 4 Drawing Sheets

U.S. PATENT DOCUMENTS

| | | |
|---|---|---|
| 4,658,656 | 4/1987 | Haeg . |
| 4,875,374 | 10/1989 | Pinson . |
| 5,343,752 | 9/1994 | Woyski et al. . |
| 5,572,440 | 11/1996 | Harashima et al. . |
| 5,610,330 | 3/1997 | Fricke et al. . |
| 5,675,505 | 10/1997 | Trimboli . |
| 5,901,553 * | 5/1999 | Cullen ................................... 60/274 |
| 6,082,177 * | 10/1998 | Niazy et al. ........................ 73/23.31 |
| 6,085,132 * | 7/2000 | Ishii et al. .............................. 701/29 |

* cited by examiner

METHOD AND SYSTEM FOR DYNAMIC TESTING OF A VEHICLE EXHAUST SYSTEM IN A RIGID FRAME TEST FIXTURE

TECHNICAL FIELD

The present invention generally relates to vehicle test fixtures which simulate vibrational effects of road conditions and, more specifically, to a method for determining accurate test control input signals for such a fixture suitable for testing a vehicle exhaust system.

BACKGROUND ART

Generally, a vehicle exhaust system must perform several demanding and diverse requirements, i.e., attenuating engine noise while porting and reducing emission levels of engine exhaust gas to the atmosphere. In addition, legislative action in combination with typical market driven design concerns have made the need for durable exhaust systems greater than ever before.

Thus, the need for determining exhaust system durability in a cost effective manner has generated demand for a system capable of verifying complete system performance prior to integration with a vehicle. Due to reduced product cycle time, physical testing of system level hardware and durability has been used to validate computer aided engineering (CAD) analysis. However, the methods of determining durability to date have not proven reliable. Thus, physical test fixtures are typically used in an attempt to simulate actual road conditions for measuring system durability.

However, the problem with using physical test fixtures is that reliability of the test results is directly related to the realism with which the input control signals/boundary conditions simulate actual road conditions. While the structural materials of the exhaust system have generally linear responses, other factors such as exhaust hanger isolations, are nonlinear or not well defined but will greatly influence the exhaust system dynamic loads, accelerations, and displacements. As a result, a need exists for a method which can accurately define these control signals and boundary conditions for application to a test fixture.

DISCLOSURE OF THE INVENTION

It is, therefore, an object of the present invention to provide a method and system for defining engine hot exhaust thermal profiles, engine attachment control boundary conditions, and vehicle frame control signals for input to an exhaust system laboratory test fixture which will accurately reproduce real world dynamic load conditions on the tested exhaust system.

In accordance with this and other objects, the present invention provides a method and system for generating engine attachment control boundary conditions and corresponding actuator control signals for an exhaust system laboratory test fixture in which actual acceleration road load data is initially collected for both a vehicle frame at each of the locations where the exhaust system attaches to the vehicle frame, and relative displacement or acceleration data for a vehicle powertrain relative to the vehicle frame, after which a remote parameter control processor is programmed to obtain vehicle coordinates for positioning of test fixture accelerometer locations by identifying the vehicle coordinates that define the locations and directions on the vehicle frame at which the actual acceleration road load data was collected. A rigid body analysis is performed by applying the actual acceleration road load data and the identified vehicle coordinates in a statistical multiple linear regression analysis to define a rigid body that fits the road load acceleration data at the vehicle coordinates. The fit of the defined rigid body can be verified. Then, boundary conditions on the test fixture are determined by selecting a set of accelerometer locations and directions which best define and fit the defined rigid body. Determination of the boundary conditions includes determining the number of degrees of freedom (DOF) from 1 to 6 needed to control the powertrain and chassis. The actuator control signals are determined based on the determined boundary conditions in combination with a first control model arranged to control frame motion relative to a test floor, and a second control model arranged to control powertrain motion relative to the frame and/or chassis exhaust components if the test fixture is to be operated in a powertrain frame attached mode.

Thus, the present invention provides a method for defining engine attachment control boundary conditions for an exhaust system laboratory test fixture which will reproduce the dynamic behavior of the vehicle powertrain during operation in conjunction with reproducing the dynamic behavior of the vehicle frame during operation in the area where the exhaust system is attached to the vehicle frame.

The above object and other objects, features and advantages of the present invention are more readily understood from a review of the attached drawings and the accompanying specification and claims.

BEST MODES FOR CARRYING OUT THE INVENTION

Figure 1:
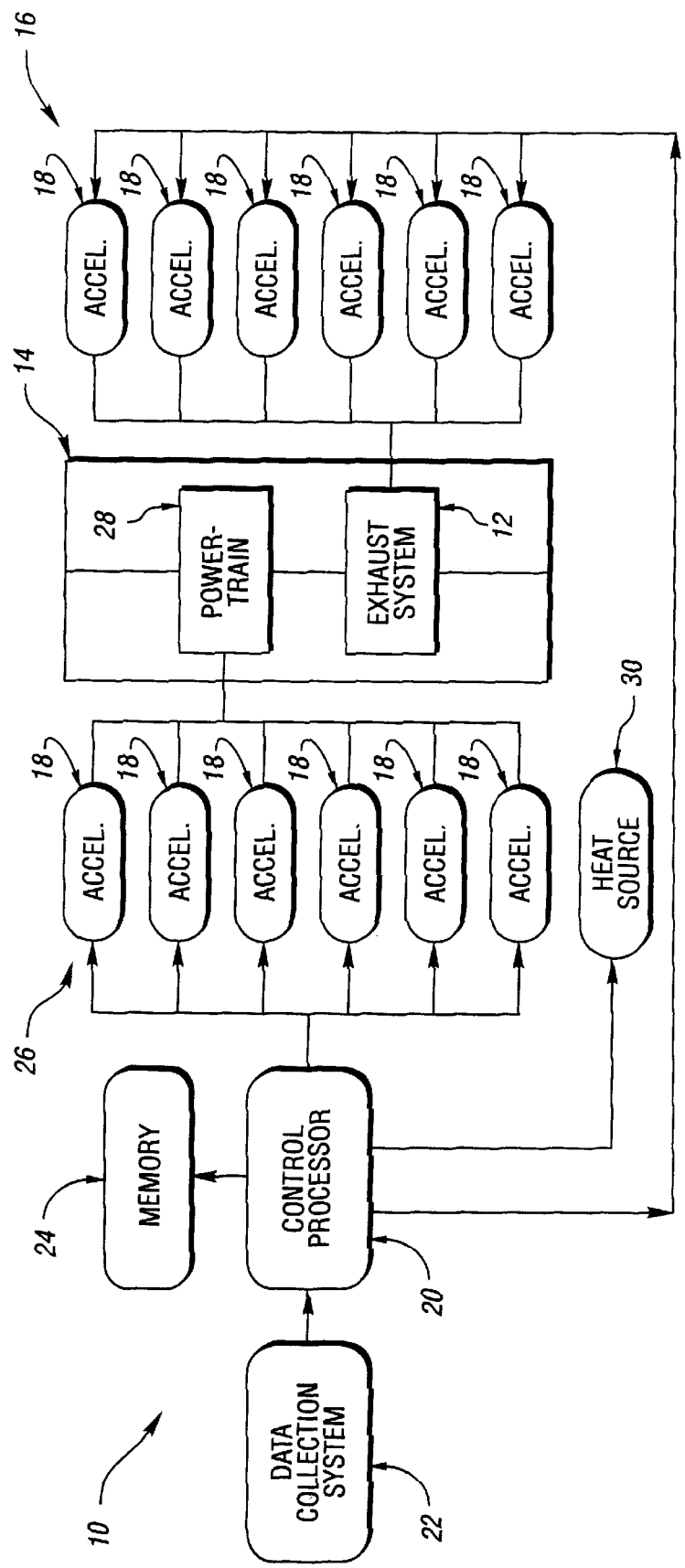
FIG. 1 is a block diagram representation of an exhaust system laboratory test fixture arrangement in accordance with the present invention.

Referring first to FIG. 1, a laboratory test fixture arrangement 10 is arranged to provide simulated testing of the durability of a vehicle exhaust system 12. In one embodiment, the test fixture arrangement includes a test frame 14 forming a chassis portion, and a powertrain 28 coupled thereto. The test frame is formed as a tubular or rectangular frame is fabricated from steel and/or aluminum, and is dimensioned so that exhaust system hanger points and/or powertrain may be supported. Alternatively, test fixture arrangement 10 can utilize a generic rigid body mass table formed as a multi-purpose, flat table that can be moved in a planar motion having up to 6 degrees-of-freedom motion. The table is arranged to support either or both the powertrain or chassis portion of the system under test. The choice of using either a generic fabricated frame rail or rigid body mass table is based such factors as system dynamics, exhaust system compatibility and ease of use. While the remaining description is directed primarily to the frame rail arrangement, the present invention is equally applicable to the rigid body mass table as though substituted therefor.

Test fixture 14 is coupled to a first and second set of hydraulic actuators 16 and 26. The first set of actuators 16 are arranged to effect displacement about six degrees of freedom (6 DOF) of a point on the frame, while the second set of actuators are arranged to effect displacement of the powertrain 28 when the test fixture is operated in a first "powertrain-frame attached" mode of operation. As discussed below, test fixture can be operated in an alternative "powertrain-frame detached" mode of operation.

In a preferred embodiment, six actuators in total are used for each set. For the powertrain set 26, three actuators effect displacement in the vertical direction, two are for the lateral direction, and one is for the longitudinal direction. For the 6 DOF set 16, three actuators are for translational displacement, and three are for rotational displacement. The actuators operate to transfer mechanical forces to frame 14 and/or powertrain 28 so as to simulate road induced dynamic stresses on a vehicle frame. Exhaust system 12 and powertrain 28 are attached to frame 14 in the same manner as would be used for actual in-vehicle installation.

As noted above, actuators 26 are utilized to simulate powertrain displacement only when the test fixture is utilized in a powertrain-frame attached mode of simulation. In other words, the hydraulic actuators that control the powertrain are coupled to or react against the chassis portion of the test frame in accordance with the control arrangement described below. In-effect, the relative motion of the supporting frame of the powertrain hydraulic actuators move as a rigid body relative to the chassis frame, while the motion of the powertrain is independent relative to the motion of the chassis frame and is controlled solely by the input drive control signal.

In contrast, in the powertrain-frame detached mode of operation, the powertrain is effectively "decoupled" from the chassis portion of the test fixture. Thus, input dynamics, i.e., inertial reaction forces, produced by the powertrain will not react with the chassis frame. This obviates production of undesirable modal responses in the operational control range of the chassis frame. This mode of operation is appropriate when a vehicle does not completely behave as a rigid body.

Each actuator 16 and 26 includes an accelerometer 18, or other suitable mechanism for causing displacement, and is arranged to receive control and boundary signals from a real time simulation control processor 20. The control and boundary signals drive the respective accelerometers to impart the desired forces onto test fixture 14. The drive-file or command signals to the actuators can be in the form of time phased matched accelerations or displacements in a predetermined direction to create "modes" of input for vertical, lateral, and longitudinal directions, as well as translational and rotational directions of pitch, roll, and yaw.

System 10 further includes a device 30 for applying heat to the exhaust system 12. Heating device 30 would be arranged to be responsive to control signals so as to dynamically emulate the thermal stresses produced when hot exhaust gas passes through the exhaust system.

Control system 20 is arranged in accordance with the present invention to define engine attachment control boundary conditions and control signals for controlling the respective accelerometers and actuators of the test fixture to reproduce both the dynamic behavior of a vehicle's powertrain during operation, and the dynamic behavior of the vehicle frame during operation in an area where the exhaust system is attached to the vehicle frame.

In accordance with another aspect of the present invention, hot exhaust thermal profiles are determined as part of the control process to generate heating control signals which emulate the real world dynamic thermal stresses caused by hot exhaust gases flowing through the exhaust system. Both of these aspects are described more fully below.

Control processor 20 includes suitable programming to produce the desired responses and drive files to derive these thermal profiles, and boundary and control signals based on actual road data collected by a suitable data collection subsystem 22. The derived thermal profiles, and boundary and control signals are stored in a suitable memory arrangement 24.

Figure 2:
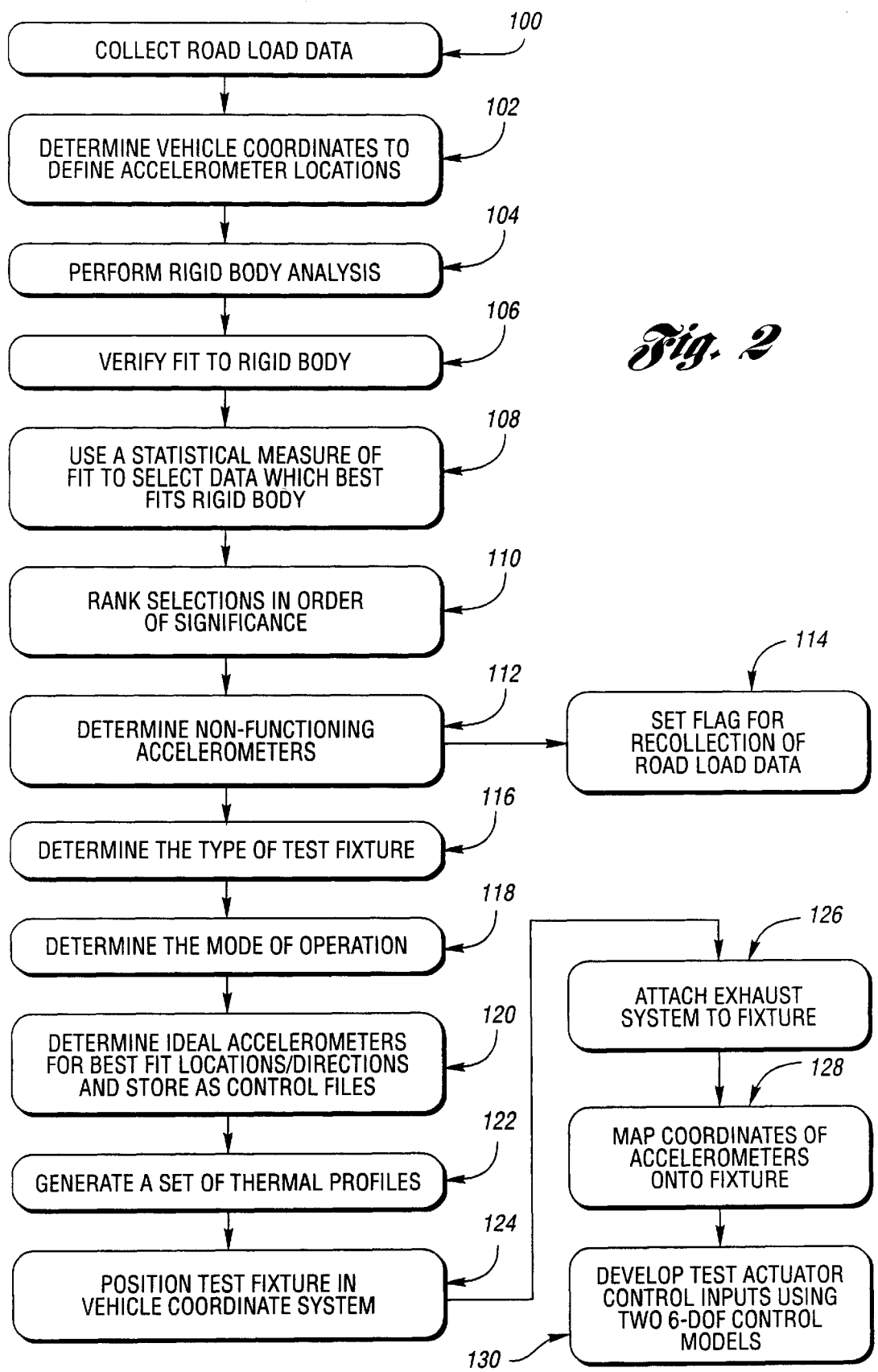
FIG. 2 is a flowchart illustrating the overall process for defining engine and chassis attachment control boundary conditions and appropriate control signals for test fixture of FIG. 1 in accordance with a first embodiment of the present invention.

The overall process for defining the engine attachment control boundary conditions, hot exhaust thermal profiles, and appropriate control signals in accordance with the present invention will now be described in context with the flowchart shown in FIG. 2. More specifically, as denoted at block 100, appropriate acceleration road load data is generated in accordance with a first embodiment by collecting during vehicle operation acceleration road load data in the vertical, lateral, and longitudinal directions along a vehicle frame rail, including at each of the locations where the exhaust system attaches to the vehicle frame. In a preferred embodiment, approximately 80 channels of data are collected. In addition, relative displacement or acceleration data is simultaneously collected for the powertrain that will define its six degrees of freedom (6-DOF) rigid body motion with respect to the local vehicle frame. This data is representative of the mechanical forces encountered by the exhaust system during use of the vehicle.

In further accordance with the present invention, realism of the testing process can be increased by further simulating the thermal stresses placed on the exhaust system as a result of hot exhaust gas passing through the system. Thus, in addition to collecting mechanical road load data, data is also collected at block 100 which is representative of temperatures and thermal cycling produced throughout the exhaust system during operation of the vehicle.

In an alternative embodiment, data can be collected for the powertrain that will define absolute 6-DOF rigid body motion, such as point acceleration data.

Then, at block 102 the vehicle coordinates of the accelerometer locations are obtained by referencing vehicle frame drawings and/or an actual vehicle to identify the vehicle coordinates that define the locations of the accelerometers used to collect the acceleration road load data of block 100.

At block 104, rigid body analysis is performed by applying the acceleration data and coordinates that define the locations of each of the accelerometers on the vehicle frame in a statistical multiple linear regression analysis to define a rigid body that fits the road load acceleration data at the identified coordinates. The fit of the defined rigid body is then verified for accuracy as denoted at block 106. This process is described in more detail below in connection with FIG. 4.

As denoted by blocks 108–114, the results of the rigid body analysis are then used to derive or select the appropriate control channels for the boundary conditions on the test fixture. More specifically, in a preferred embodiment, a statistical measure of fit is used to select acceleration data at block 108 to define the locations and directions that best fit the defined rigid body. One example of a suitable statistical measure for fit is the correction coefficient of multiple determination ($R^2$) which is defined as:

$$R^2 = SS_R \div SS_T,$$

where:

SS is the sum of squares;

R are residuals; and

T are the total.

These selections are then ranked in order of significance at block 110. The top six locations and directions are selected in the preferred embodiment of the present invention.

In addition to finding and ranking best fit of acceleration data, this process will also provide an indication as to which if any of the accelerometers did not function properly as denoted at block 112. The detection of non-functioning or non-optimal accelerometers can be used to activate a flag at block 114 indicating that the road load data should be recollected with accelerometers that function properly.

It is noted that the top six locations and directions from the ranking process of block 110 may not uniquely define the six degrees of freedom of the rigid body as they may not form a linearly independent set of data. Thus, appropriate mathematical tools known to one of ordinary skill in the art can be applied to ensure that the six selections are independent. In addition, the selection process determines the number of degrees of freedom (DOF) from 1 to 6 needed to control the powertrain, and indicates the type of test fixture to be used and whether the attached or detached mode of operation is selected. This aspect of the present invention is denoted at block 116 which provides for determination of the type of test fixture, and block 118 which provides for determination of the mode of operation, i.e., powertrain-frame attached or powertrain-frame detached.

At block 120 the ideal accelerations associated with the defined rigid body motion for the best fit locations and directions are then determined. These ideal accelerations are stored as control channel acceleration files.

At block 122, the temperature and thermal cycling data is then used to generate a set of thermal profiles. The generated thermal profiles will be applied as control signals to the heat source 30 during testing of the system 12.

At blocks 124 and 126, the test fixture is positioned in the vehicle coordinate system and the exhaust system attached to the test fixture frame in the same manner as an actual vehicle frame. The test fixture frame may be either a generic frame rail fabricated based on vehicle dimensions, or a generic rigid body mass table. The frame is arranged to define and support the appropriate powertrain attachment points for the exhaust system in the vehicle coordinate system with a connection system that simulates the exhaust/manifold attachment used in an actual vehicle. With the position of the test fixture defined in the vehicle coordinate system, the coordinates of the control accelerometers are then mapped onto the test fixture frame or rigid body fixture at block 128.

As denoted at block 130, two independent 6-DOF test control models are used to develop the test inputs from the boundary conditions derived from both the control acceleration files (as determined in block 116) and the locations of the accelerometers. One model will control frame motion relative to the test floor, and the other model will control powertrain motion relative to the frame if the powertrain-frame attached mode of operation was selected.

For road data collected as in the first embodiment of block 100, both models and both sets of boundary condition data may be used simultaneously to develop the test inputs. For road data collected as in the alternative embodiment of block 100, higher efficiency is attained by first developing the frame control signals without applied powertrain motion. When complete, the control processor determines the powertrain boundary condition error which exists when the frame system is driven, which is then used to develop the correct simulated powertrain test motion. Due to the extreme dynamic nature of some events, however, it may be safer for the test specimen to alternate frame and powertrain iterations or even simultaneously develop the two sets of inputs. However, reducing powertrain boundary condition error using absolute motion will be very slow in this mode, because initial absolute error calculations will be equally dominated by frame motion error and relative powertrain motion error, and cannot be correctly interpreted by the powertrain control model.

Figure 3:
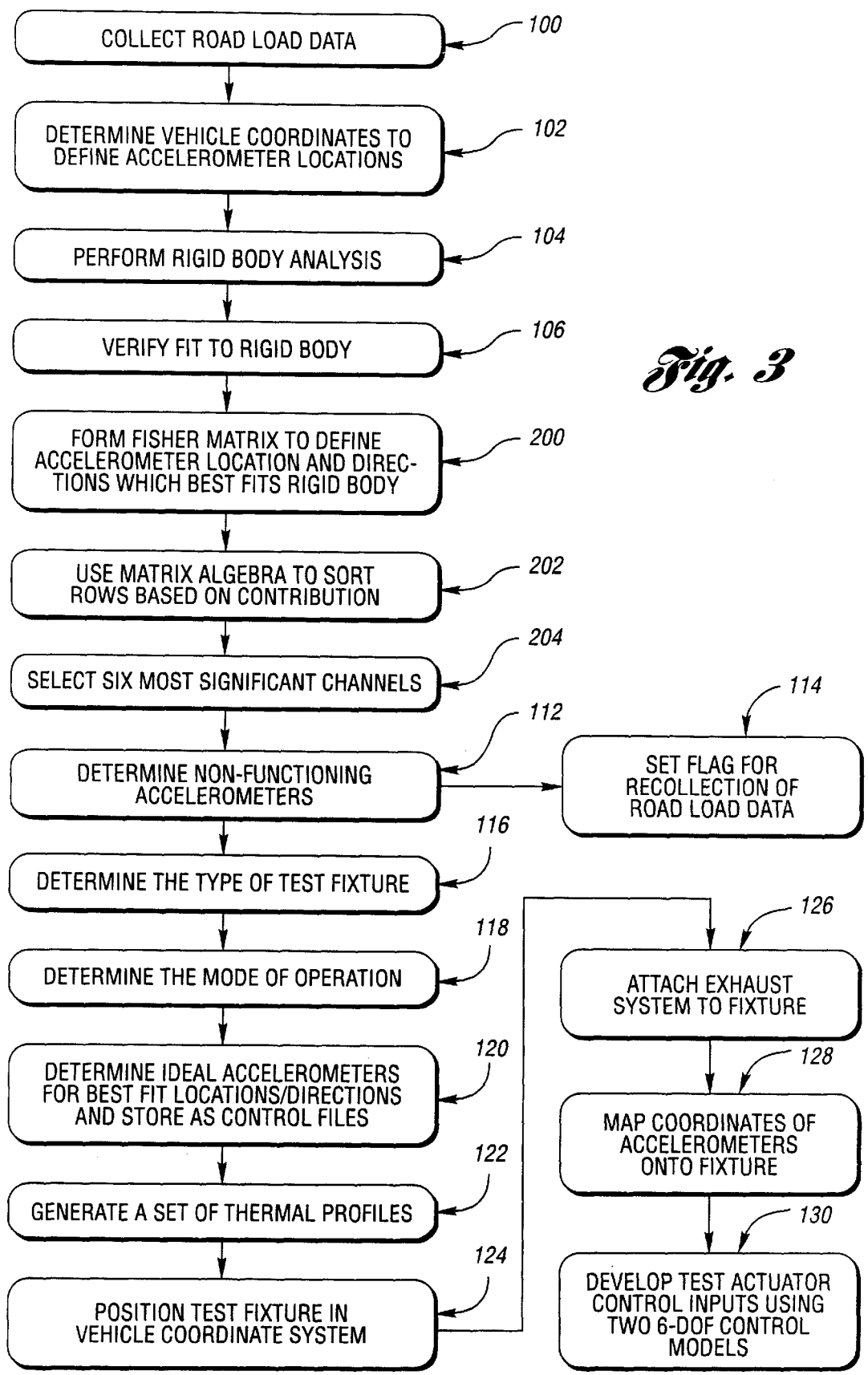
FIG. 3 is a flowchart illustrating the overall process for defining engine and chassis attachment control boundary conditions and appropriate control signals for test fixture of FIG. 1 in accordance with a second embodiment of present invention.

An alternative embodiment for blocks 108–114 is shown in FIG. 3, where like blocks of operation have been denoted with like reference numerals. In the embodiment of FIG. 3, acceleration data is selected at block 200 to define the locations and directions that best fit the defined rigid body by forming a "Fisher Information Matrix" representing the system based on the locations and directions of the measurements. Then, at block 202, matrix algebra is used to sort the rows of the matrix based on their respective contribution to the rank of the matrix. In accordance with this embodiment of the present invention, the acceleration data corresponding to higher rows in the matrix are preferred over lower rows. Thereafter, as denoted at block 204 a minimum of the six most significant channels are determined from this process and used as the control channels for the test fixture boundary conditions.

A more detailed explanation will now be made with respect to the rigid body modeling of the present invention in conjunction with FIG. 4. More specifically, a rigid body in space has six degrees of freedom. If more than six independent measurements are made on the body, an estimate can be made of the six degrees of freedom of the rigid body model. The estimated values of the degrees of freedom are then used to predict the measured values. The difference between the actual measurement and the predicted measurement then provides a measure of the validity of the defined rigid body model.

Figure 4:
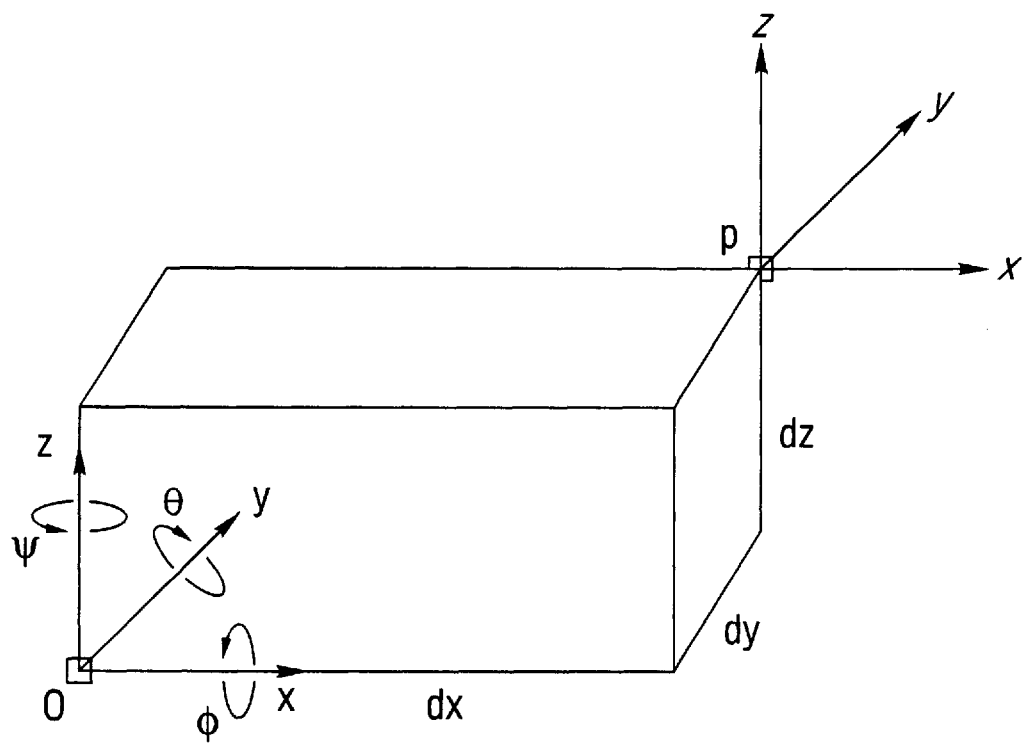
FIG. 4 is a schematic representation of a rigid body.

FIG. 4 shows a schematic of a rigid body. A convenient point 0 on the body is chosen as a reference point. The six degrees of freedom for the body are taken to be the three translations and three rotations of this point. The linear acceleration of point P, fixed on the body, can then be written as:

$$a_p = a_o + a_{p/o}$$
$$= a_o + \omega X d + \omega X (\omega X d)$$

where w is the angular velocity of the rigid body and d is the vector from point 0 to point P. The "X" denotes a vector cross product operation. If the third term in the above expression is ignored, the three components of linear acceleration at P become:

$$x_p = x_0 + d_z \dot{\omega}_Y - d_Y \dot{\omega}_Z \qquad (1)$$

$$y_p = y_0 + d_z \dot{\omega}_X - d_X \dot{\omega}_Z \qquad (2)$$

$$z_p = z_0 + d_Y \dot{\omega}_X - d_X \dot{\omega}_Y. \qquad (3)$$

The neglected terms correspond to centripetal acceleration, and are small compared to total linear acceleration (of the order of 1/1000) for typical test conditions.

Each measurement can now be written using one of the equations (1)–(3). Each of these equations is linear with respect to the degrees of freedom, $X_0, Y_0, Z_0, \omega_x, \omega_y, \omega_z$. All these equations can be collected together and be written as:

$$(r)=[A]\{q\}$$

where (r) is an n×1 vector of acceleration measurements, [A] is a n×6 matrix of coefficients, and {q} is a 6×1 vector of the rigid body degrees of freedom, $(X_0, Y_0, Z_0, \omega_x, \omega_y, \omega_z)^T$.

If there are six independent measurements (i.e., n=6), matrix [A] will be a non-singular square matrix for which {q} can be solved. If the body is not very rigid, {q} will still exist but may not contain any physical meaning.

If there are more than six independent measurements (i.e., n>6), an over-determined linear system will exist. This can be solved in a least square sense as:

$$\{q\}=[[A]^T[A]]^{-1}[A]^T\{r\}.$$

This is also the formulation for a linear regression problem. If the body is assumed to be rigid, the measurements can be expected to be:

$$\{r'\}=[A]\{q\}.$$

Now, if the body is truly rigid, {r'} will be identical to {r}. The closeness between {r} and {r'} is a measure of the validity of the rigid body assumption. This measure may be the $R^2$ value of the linear regression, defined below.

$$R^2=(SST-SSE)/SST$$

where $$SST=\Sigma(r_i-r^*)^2$$

and $$SSE=\Sigma(r_i-r_i')^2,$$

where $r^*$ is the mean of $r_i$. When $R^2$ is 1, a perfect fit exists and hence a perfectly rigid body.

Thus, the present invention provides a method and system capable of generating accurate engine attachment control boundary conditions and corresponding control signals for an exhaust system laboratory test fixture which accurately reproduce both the dynamic behavior of a vehicle powertrain during operation, and the dynamic behavior of the vehicle frame during operation in the area where the exhaust system is attached to the vehicle frame.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A method for generating engine attachment control boundary conditions and corresponding actuator control signals for an exhaust system laboratory test fixture comprising:

collecting actual acceleration road load data for both a vehicle frame at each of the locations where the exhaust system attaches to the vehicle frame, and relative displacement or acceleration data for a vehicle powertrain relative to the vehicle frame;

obtaining vehicle coordinates for test fixture accelerometer locations by identifying the vehicle coordinates that define the locations and directions on the vehicle frame at which the actual acceleration road load data was collected;

performing a rigid body analysis by applying the actual acceleration road load data and the identified vehicle coordinates in a statistical multiple linear regression analysis to define a rigid body that fits the road load acceleration data at the vehicle coordinates;

verifying the fit of the defined rigid body;

determining boundary conditions on the test fixture by selecting a set of accelerometer locations and directions which best fit the defined rigid body; and determining the actuator control signals based on the determined boundary conditions in combination with a first control model arranged to control frame motion relative to a test floor.

2. The method of claim 1 wherein determining boundary conditions comprises selecting road load data using a statistical measure of fit to define the locations and directions that best fit the defined rigid body.

3. The method of claim 2 wherein the statistical measure of fit comprises an $R^2$ correction coefficient analysis.

4. The method of claim 2 further comprising ranking the selected road load data in order of significance.

5. The method of claim 2 wherein the top six data locations and directions are selected.

6. The method of claim 1 wherein determining boundary conditions comprises forming a Fisher Information Matrix representing the system based on the locations and directions of the measurements.

7. The method of claim 6 further comprising sorting the rows of the matrix based on their respective contribution to the rank of the matrix, and selecting the data corresponding to higher rows in the matrix.

8. The method of claim 1 wherein collecting road load data comprises collecting acceleration road load data in the vertical, lateral, and longitudinal directions on a vehicle frame during vehicle operation at each of the locations where the exhaust system attaches to the vehicle frame.

9. The method of claim 8 wherein collecting road load data further comprises collecting relative displacement or acceleration data for the powertrain to define a six degrees of freedom rigid body motion with respect to the local vehicle frame.

10. The method of claim 9 wherein determining the actuator control signals comprises simultaneously using the first and second control models with the determined boundary conditions.

11. The method of claim 8 wherein collecting road load data further comprises collecting point acceleration data for the powertrain to define an absolute six degrees of freedom rigid body motion.

12. The method of claim 11 wherein determining the actuator control signals comprises by first developing the frame control signals without applied powertrain motion, and then determining a powertrain boundary condition error which exists when the frame system is driven to determine a correct simulated powertrain test motion.

13. The method of claim 1 further comprising:

collecting data representative of actual exhaust system temperature and thermal cycling produced during operation of a vehicle;

generating a set of at least one thermal profile; and heating the exhaust system attached to the test fixture based on the generated set of thermal profiles.

14. The method of claim 1 further comprising determining whether to operate the test fixture to simulate the effect of the vehicle powertrain being attached to the vehicle frame based on the rigid body analysis, and determining the actuator control signals based on the determined boundary conditions in combination with a second control model arranged to control powertrain motion relative to the frame if the test fixture is to be operated as though the powertrain were attached to the frame.

15. The method of claim 14 further comprising determining to operate the test fixture as though the powertrain were not attached to the frame if the vehicle is determined to not behave like a rigid body.

16. The method of claim 1 further comprising selecting whether to use a fabricated frame rail or a rigid body mass table as the type of test fixture.

17. A system for generating engine attachment control boundary conditions and corresponding actuator control signals for an exhaust system laboratory test fixture, wherein the test fixture includes a set of accelerometers mounted thereon and controlled by the actuator control signals to test a vehicle exhaust system mounted to the fixture, wherein the system comprises:

a data collection subsystem arranged to collect actual acceleration road load data for both a vehicle frame at each of the locations where the exhaust system attaches to the vehicle frame, and relative displacement or acceleration data for a vehicle powertrain relative to the vehicle frame;

control processor connected to the set of accelerometers and responsive to the collected data to obtain vehicle coordinates for a set of locations for the test fixture accelerometers by identifying the vehicle coordinates that define the locations and directions on the vehicle frame at which the actual acceleration road load data was collected, the control processor being further arranged to perform a rigid body analysis by applying the actual acceleration road load data and the identified vehicle coordinates in a statistical multiple linear regression analysis to define a rigid body that fits the road load acceleration data at the vehicle coordinates, determine boundary conditions on the test fixture by selecting a set of accelerometer locations and directions which best fit the defined rigid body, and determine the actuator control signals based on the determined boundary conditions in combination with a first control model arranged to control frame motion relative to a test floor.

18. The system of claim 17 wherein the set of actuators comprises six actuators.

19. The system of claim 18 wherein three actuators are arranged in a vertical direction, two actuators are arranged in a lateral direction, and one actuator is arranged in a longitudinal direction.

20. The system of claim 17 wherein the system further comprises a heat generating device connected to an exhaust system mounted on the fixture, wherein the data collection subsystem is further arranged to collect data representative of actual exhaust system temperature and thermal cycling produced during operation of a vehicle, and the control processor is further arranged to generate at least one thermal profile to control the heat generating device to heat the exhaust system attached to the test fixture based on the generated thermal profile.

21. The system of claim 17 wherein the control processor is further arranged to determine based on the rigid body analysis whether to operate the test fixture so as to simulate the effect of the vehicle powertrain being attached to the vehicle frame, and determine the actuator control signals based on the determined boundary conditions in combination with a second control model arranged to control powertrain motion relative to the frame.

22. The system of claim 17 wherein the test fixture comprises a fabricated frame rail test fixture.

23. The system of claim 17 wherein the test fixture comprises a rigid body mass table test fixture.

* * * * *